Nov. 28, 1967  T. R. LEONARD  3,354,988
ENGINE WITH BAFFLED OIL PAN

Filed Sept. 17, 1965  2 Sheets-Sheet 1

INVENTOR.
Thomas R. Leonard
BY
J. L. Carpenter
ATTORNEY

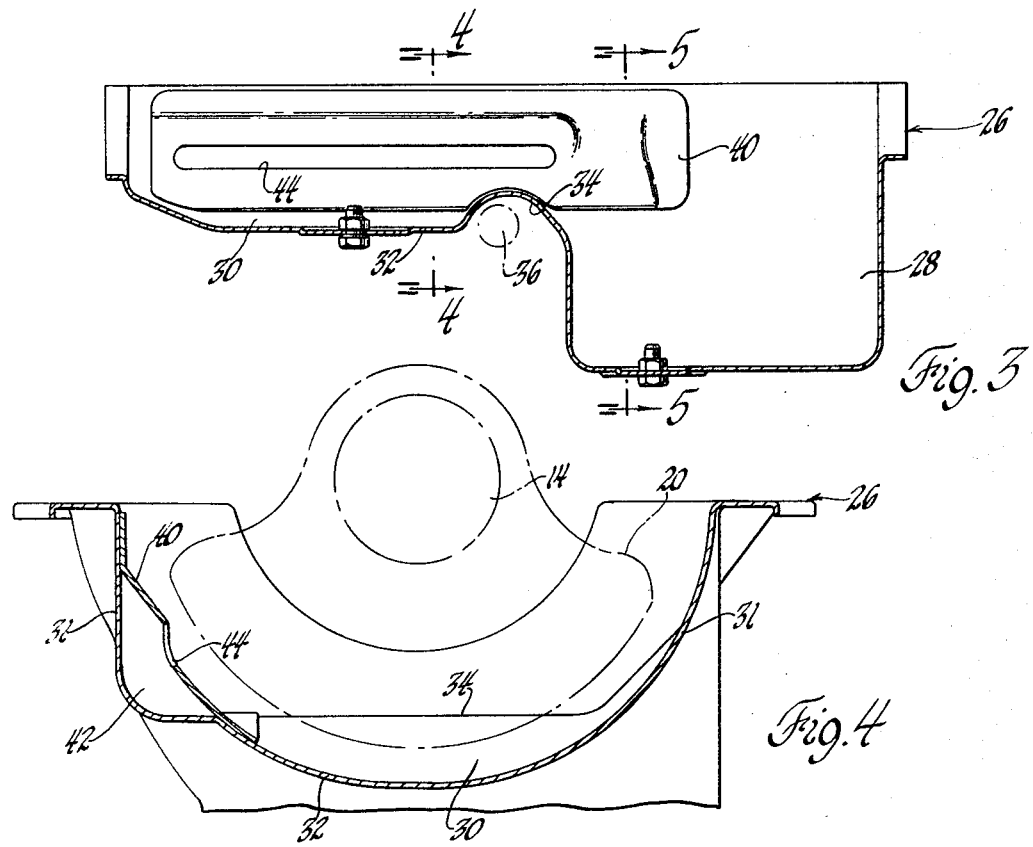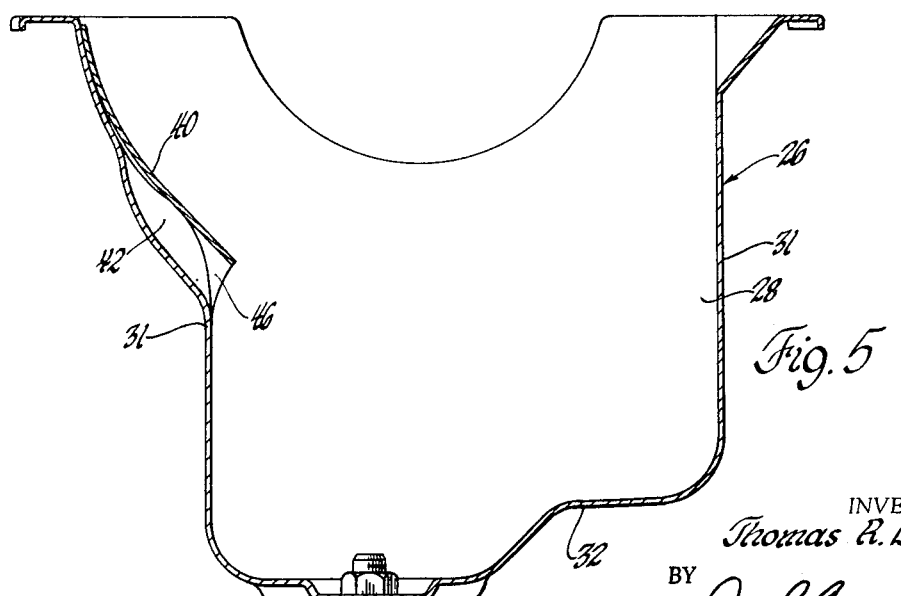

United States Patent Office 3,354,988
Patented Nov. 28, 1967

3,354,988
ENGINE WITH BAFFLED OIL PAN
Thomas R. Leonard, Lansing, Mich., assignor to General Motors Corporation, Detroit, Mich., a corporation of Delaware
Filed Sept. 17, 1965, Ser. No. 488,146
8 Claims. (Cl. 184—6)

ABSTRACT OF THE DISCLOSURE

An engine includes an oil pan having a sump portion at one end and a shallow portion at the other separated by a raised transverse tunnel arranged to provide clearance for a power output shaft to pass close to the longitudinal axis of the engine crankshaft. The transverse tunnel extends close to the center bearing cap and above the lowest positions reached by the adjacent crank throws and counterweights of the crankshaft. A baffle along one side of the pan includes an opening extending substantially the length of the shallow portion which receives oil swept to the side of the shallow portion by rotation of the crankshaft. The baffle cooperates with the pan side wall to form a channel which receives oil from the baffle opening and carries it over the tunnel and through an opening to the pan sump portion so as to prevent an excessive accumulation in the pan shallow portion due to the damming action of the raised tunnel.

---

This invention relates to internal combustion engines and, more particularly, to an oil pan having internal baffle means to carry lubricating oil over a raised central portion of the pan and return it to a sump portion.

In internal combustion engines of conventional construction, it is common practice to provide a removable oil pan located beneath the crankshaft and reciprocating parts of the engine. The oil pan commonly includes a sump portion in which the major portion of the lubricating oil charge for the engine is contained and from which it is drawn by a lubricating oil pump for delivery to the engine oil system. The oil is used for lubricating the various bearings in the engine and then drains back from the interior portions of the engine to the engine oil pan, the floor of which is slanted so as to return the oil to the sump portion of the pan for re-use or storage.

The present invention relates to an engine oil pan in which the pan floor includes a raised portion extending transversely across the pan and separating the sump portion in the rear of the pan from a relatively shallow portion in the front of the pan. The transversely extending raised portion is provided to permit the disposition of a transverse power output shaft closely underneath the engine. For this purpose, the raised portion of the pan is located between crank throws of the engine crankshaft and extends above the lowest point reached by the crank throws and counterweights during the rotational operation.

Although the front portion of the pan is made as shallow as possible with a minimum of clearance between the pan floor and the crank throws and counterweights, the raised portion acts as a dam, separating the front portion from the rear sump portion. It thus tends to prevent a portion of the oil from returning to the sump and to create a high level pool of oil. Should this be allowed, the oil would be churned up by the rotating crank throws and counterweights causing oil aeration and withholding an excessive amount of oil from the sump portion of the oil pan.

To overcome this problem, a baffle member is mounted along one side of the pan to collect the oil swept to the side of the pan shallow portion by the rotating crank throws and counterweights. The collected oil is prevented from returning to the shallow portion of the pan but is directed through a main passage formed by the baffle member and the side of the pan, passing over the raised portion of the pan and back to the sump portion in the rear. The simple baffling arrangement, thus, overcomes the problems which would otherwise be caused by excessively hight level and volume of oil in the front portion of the pan.

Additional objects and advantages of the invention will be made apparent by the following description and drawings disclosing a preferred embodiment of the invention and in which:

FIGURE 3 is a longitudinal cross-sectional view taken generally along the line 3—3 of FIGURE 2;

FIGURE 4 is a transverse cross-sectional view through the shallow portion of the pan taken generally along the line 4—4 of FIGURE 3; and FIGURE 5 is a transverse cross-sectional view through the sump portion of the pan taken generally along the line 5—5 of FIGURE 3.

Figure 1:
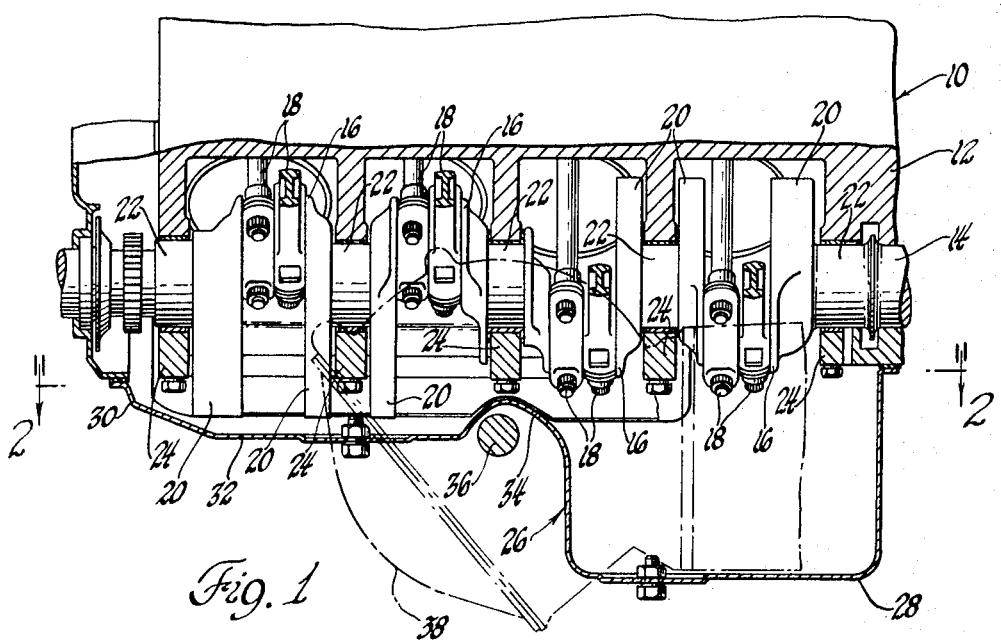
FIGURE 1 is a fragmentary cross-sectional view of an engine and oil pan assembly embodying the invention.
Figure 2:
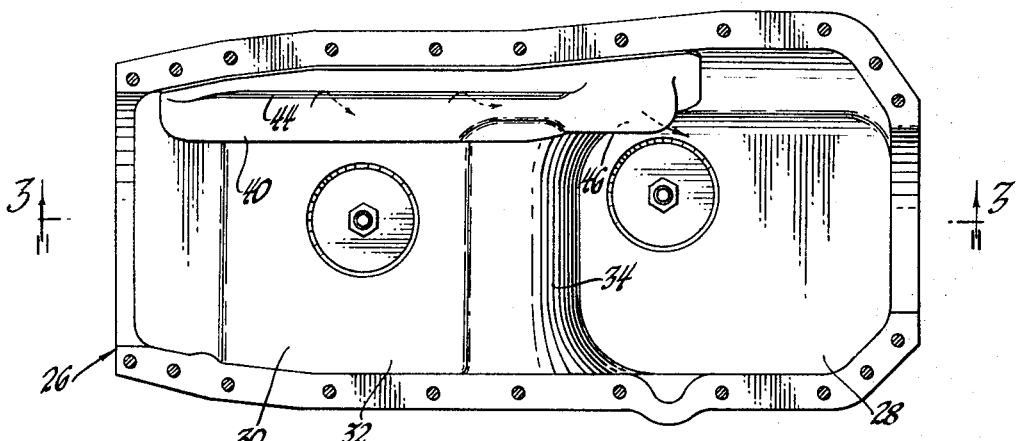
FIGURE 2 is a top view of the oil pan of FIGURE 1 taken generally along the line 2—2 of the figure.

Referring now to the drawings, FIGURE 1 discloses an internal combustion engine generally indicated by numeral 10 and having a frame 12 in which is rotatably carried a crankshaft 14. The crankshaft includes a plurality of longitudinally spaced crank throws 16 to which are attached the usual connecting rods 18. Adjacent the crank throws are a number of counterweights 20 for balancing the crankshaft and the reciprocating parts of the engine connected to the crankshaft. The crankshaft is supported in the engine frame at journals 22 spaced intermediate each of the crank throws and at the ends of the crankshaft by a plurality of bearing caps 24 extending thereunder. The crank throws 16 and the counterweights 20 are located eccentric to the center line of the crankshaft so that, at their lowest positions reached during rotation of the crankshaft, they extend substantially below the lower surfaces of bearing caps 24.

Sealingly secured to the engine frame 12 and extending the length of the engine beneath the crankshaft is an oil pan generally indicated by numeral 26. The oil pan includes a relatively deep sump portion 28 located under the rear portion of the engine and a shallow portion 30 located under the front portion of the engine. These portions are defined in part by side walls 31 connected by a floor 32 which, in the shallow portion of the pan, closely surrounds the engine crankshaft, having a minimum of clearance from the lower positions of the crank throws and counterweights.

Between the sump portion 28 and the shallow portion 30, the pan floor 32 includes an arcuately shaped raised portion 34 extending transversely across the pan to provide a raised tunnel through which a power output shaft 36 extending from final drive housing 38 (indicated by phantom lines) may pass transversely under the engine near the location of the center main journal. To permit the output shaft to pass as closely as possible to the crankshaft axis, the raised portion 34 of the oil pan floor is located intermediate the center pair of crank throws and extends above the lowest position of the crank throws and counterweights to a point close to the center main bearing cap.

The raised floor portion 34, extending across the center of the pan, creates a dam which tends to prevent oil collecting in shallow portion 30 of the pan from returning to the sump portion 28 at the rear of the pan. Without additional means to return the oil to the sump during operation of the engine, an excessive volume of oil would collect in the shallow portion of the pan and would be whipped into an aerated foam by the rotation of the crank throws and counterweights through the oil. Retention of this oil in the pan shallow portion would also tend to lower the level of oil in the sump portion 28 and starve the engine lubricating oil system.

To overcome this problem, a baffle 40 is provided extending longitudinally along one side of the pan. The baffle cooperates with the side walls of the pan to form a chamber 42 extending substantially the length of the pan shallow portion and over raised portion 34 to a point above sump portion 28. A longitudinally extending opening 44 is provided midway up the baffle through which oil splashed toward the side of the pan by the crank throws and the counterweights is received within chamber 42. The baffle prevents the return of oil thus received to the shallow portion of the pan and drains the oil to the rear of the pan over raised portion 34 and out an opening 46 formed between the baffle member and the side of the pan above the sump portion 28. Thus, the collection of an excessive pool of oil in the front shallow portion of the pan is prevented and the retention of a sufficient volume of oil in the sump portion of the pan is assured.

I claim:
1. In combination with an internal combustion engine having a crankshaft rotatably carried in the lower portion thereof, said crankshaft having a plurality of longitudinally spaced eccentric portions,
  an oil pan closing said engine lower portion adjacent said crankshaft and having at one end a sump portion to contain a charge of lubricating oil,
  said oil pan including a pair of side walls and a floor interconnecting said side walls, said floor having a raised portion extending transversely thereacross between said sump portion and the other end of said oil pan to provide clearance for a member to pass transverely under said pan, and
  baffle means extending longitudinally along one side of said pan and over said raised portion and including means to receive oil swept to said side of the pan other end by said crankshaft eccentric portions and to carry said oil over said raised portion and back to said sump portion to prevent the trapping of excessive oil in said pan other end by said raised portion.

2. In combination with an internal combustion engine having a crankshaft rotatably carried in the lower portion thereof, said crankshaft having a plurality of longitudinally spaced eccentric portions,
  an oil pan closing said engine lower portion adjacent said crankshaft and having at one end a sump portion to contain a charge of lubricating oil,
  said oil pan including a pair of side walls and a floor interconnecting said side walls, said floor having a raised portion extending transversely thereacross between said sump portion and the other end of said oil pan to provide clearance for a member to pass transversely under said pan,
  said raised portion being spaced longitudinally intermediate two of said cranskhaft eccentric portions and extending upwardly above the lowest point reached by at least one of said eccentric portions, and
  baffle means extending longitudinally along one side of said pan and over said raised portion and including means to receive oil swept to said side of the pan other end by said crankshaft eccentric portions and to carry said oil over said raised portion and back to said sump portion to prevent the trapping of excessive oil in said pan other end by said raised portion.

3. The combination of claim 1 wherein said eccentric portions comprise crank throws and counterweights.

4. The combination of claim 3, said raised portion being spaced longitudinally intermediate two of said crank throws and extending upwardly above the lowest point reached by at least one of said crank throws and counterweights.

5. The combination of claim 1 wherein said baffle means comprises a unitary member secured to one of said side walls and cooperating with said side wall to form an oil carrying passage and opening means in said member extending longitudinally thereof to permit oil to be swept into said passage, said member and said side wall defining a second opening connecting said passage with said sump portion.

6. The combination of claim 5, wherein said eccentric portions comprise crank throws and counterweights, the number of said crank throws being an even number and said raised portion being spaced longitudinally intermediate the center two of said crank throws and extending upwardly above the lowest point reached by said crank throws and counterweights.

7. An oil pan for use with an engine having a frame and a crankshaft rotatably carried in a lower portion of said frame, said crankshaft including a plurality of eccentric portions, said oil pan comprising
  a pair of side walls interconnected at their lower ends by a floor, said side walls and said floor partially defining a sump portion at one end of said pan and a shallow portion at the other end of said pan,
  said floor including a raised portion to provide clearance for a member to pass transversely under said pan, said portion extending transversely across said floor between said sump portion and said shallow portion and forming a dam therebetween, and
  baffle means extending longitudinally along one side of said pan and over said raised portion, said baffle means comprising a unitary member secured to one of said side walls and cooperating with said side wall to form an oil carrying passage and opening means in said member and extending longitudinally thereover substantially the length of said pan shallow portion to permit oil to be swept into said passage, said member and said side wall defining a second opening connecting said passage with said sump portion.

8. An oil pan for an internal combustion engine comprising a relatively shallow portion, a relatively deep sump portion and a transversely extending dam portion separating said shallow portion from said deep portion, said dam portion being formed by a raised portion extending across said pan to provide clearance for a member to pass transversely thereunder and means enabling oil to be drained from said shallow portion to said sump portion including a wall forming an upwardly opening channel with a side wall of said pan which leads from over said shallow portion past said dam portion to over said sump portion and within which oil may collect as a result of the effect thereon of the moving parts of said engine to a level enabling it to flow from said shallow portion into said sump portion.

References Cited
UNITED STATES PATENTS

| 1,241,589 | 10/1917 | White | 184—106 X |
| 2,988,081 | 6/1961 | Etchells et al. | 184—6 |

LAVERNE D. GEIGER, Primary Examiner.

HOUSTON S. BELL, Examiner.